(12) United States Patent
Bandy et al.

(10) Patent No.: US 11,230,836 B1
(45) Date of Patent: Jan. 25, 2022

(54) SYSTEM FOR COLLECTING DEBRIS

(71) Applicants: Kyle Allan Bandy, Columbus, OH (US); Alexa Riley Cunningham, Springfield, OH (US); Tina Marie Harris, Huber Heights, OH (US); Arizona Chenoa Henderson, Springfield, OH (US); Thomas Eugene Jenkins, Jr., Enon, OH (US); James Virgil Shaner, Springfield, OH (US); Jennifer Christina Schwaiger Tropp, Springfield, OH (US); Emma Rose Bennett, Springfield, OH (US); Braelynn Marie Cameron, Dayton, OH (US); Makenzie Sue Gossett, Enon, OH (US); Masonn James Hayslip, Enon, OH (US); Lacy Rose Herdman, Springfield, OH (US); Lillian Mae Hopkins, Enon, OH (US); Tyler Thomas Jenkins, Enon, OH (US); Kylie Yu Jian Mader, Fairborn, OH (US); Madison Leight North, Springfield, OH (US); Kacie Ann Sizer, Springfield, OH (US); Rhiannon Alyse Thomas, Fairborn, OH (US); Alexandra Elaine Tighe, Fairborn, OH (US)

(72) Inventors: Kyle Allan Bandy, Columbus, OH (US); Alexa Riley Cunningham, Springfield, OH (US); Tina Marie Harris, Huber Heights, OH (US); Arizona Chenoa Henderson, Springfield, OH (US); Thomas Eugene Jenkins, Jr., Enon, OH (US); James Virgil Shaner, Springfield, OH (US); Jennifer Christina Schwaiger Tropp, Springfield, OH (US); Emma Rose Bennett, Springfield, OH (US); Braelynn Marie Cameron, Dayton, OH (US); Makenzie Sue Gossett, Enon, OH (US); Masonn James Hayslip, Enon, OH (US); Lacy Rose Herdman, Springfield, OH (US); Lillian Mae Hopkins, Enon, OH (US); Tyler Thomas Jenkins, Enon, OH (US); Kylie Yu Jian Mader, Fairborn, OH (US); Madison Leight North, Springfield, OH (US); Kacie Ann Sizer, Springfield, OH (US); Rhiannon Alyse Thomas, Fairborn, OH (US); Alexandra Elaine Tighe, Fairborn, OH (US)

(*) Notice: Subject to any disclaimer, the term of this patent is extended or adjusted under 35 U.S.C. 154(b) by 0 days.

(21) Appl. No.: 17/111,162

(22) Filed: Dec. 3, 2020

(51) Int. Cl.
*E03F 5/14* (2006.01)
*B01D 35/02* (2006.01)
(Continued)

(52) U.S. Cl.
CPC .............. *E03F 5/14* (2013.01); *B01D 29/606* (2013.01); *B01D 35/02* (2013.01);
(Continued)

(58) Field of Classification Search
CPC ..... E03F 1/00; E03F 1/001; E03F 5/15; E03F 7/00; E03F 7/06; E03F 2201/00;
(Continued)

(56) References Cited

U.S. PATENT DOCUMENTS 3,282,430 A * 11/1966 Kinne ..................... E02B 13/00
 210/162
5,562,819 A * 10/1996 Turner, Jr ................. E03F 5/14
 210/162

(Continued)

*Primary Examiner* — Christopher Upton

(57) ABSTRACT

A system for collecting debris created for small-scale outflow pipes, including a collection net made of durable (Continued)

lightweight mesh material, for capturing debris and allowing for free flow of fluid. The collection net configured to be attached to an outflow pipe using a fixed collar and a movable collar. The system designed such that the fixed collar fits securely on outflow pipe, and the movable collar fits such that it may move towards the fixed collar longitudinally along the outflow pipe. A pressure sensor attached to the fixed collar triggers an electrical signal to alert users when a threshold capacity of the collection net is exceeded, by the pressure imparted by movable collar onto the pressure senor. An electrical signal triggers control unit to alert users when a predefined threshold is exceeded, by indicating via an indicator that capacity limits of collected debris have been exceeded.

10 Claims, 4 Drawing Sheets

(51) Int. Cl.
    *B01D 29/60*         (2006.01)
    *E03F 1/00*          (2006.01)
    *B01D 35/143*       (2006.01)

(52) U.S. Cl.
    CPC .......... *B01D 35/1435* (2013.01); *E03F 1/001* (2013.01); *E03F 2201/40* (2013.01)

(58) Field of Classification Search
    CPC ........ E03F 2201/40; E03F 5/14; B01D 29/60; B01D 29/606; B01D 35/02; B01D 35/143; B01D 35/1435
    USPC .............. 210/86, 90, 162, 170.03, 460, 461; 405/36, 37
    See application file for complete search history.

(56) References Cited

U.S. PATENT DOCUMENTS

| | | | | |
|---|---|---|---|---|
| 5,587,072 | A * | 12/1996 | Regan | B01D 35/02 405/36 |
| 6,086,758 | A * | 7/2000 | Schilling | E03F 1/00 210/164 |
| 6,210,573 | B1 * | 4/2001 | Marshall | B01D 29/96 210/461 |
| 6,334,953 | B1 * | 1/2002 | Singleton | E03F 5/14 210/460 |
| 6,358,405 | B1 * | 3/2002 | Leahy | E03F 5/14 210/86 |
| 6,875,345 | B2 * | 4/2005 | Hannah | E03F 5/14 210/162 |
| 8,974,665 | B2 * | 3/2015 | Vreeland | E03F 1/00 210/162 |
| 2013/0299435 | A1 * | 11/2013 | Coffman | E03F 1/001 210/170.03 |
| 2019/0390451 | A1 * | 12/2019 | King | E03F 5/14 |

\* cited by examiner

Collection Net 100

System For Collecting Debris 200

SYSTEM FOR COLLECTING DEBRIS

BACKGROUND

Water drainage is an important aspect for developing land and managing its use. In many drainage situations, pipes are used to direct excess water on land to watercourses, such as streams, rivers, and canals. These watercourses eventually discharge to bodies of water, such as lakes, seas, and oceans. Drainage water often carries debris into drainage pipes. The debris will eventually be discharged into watercourses, which can lead to clogging and pollution. Some municipalities are starting to deploy devices to catch debris in drainage water. These debris catching devices are often industrial-size, very expensive, and require heavy equipment to deploy, operate, and maintain. Such large debris catching devices are not feasible for small towns and private property.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The inventors recognize that small towns and individuals also need to manage water drainage debris and protect waterways from pollution. However, a major problem is that existing debris catching devices are simply too big, expensive, and too logistically complicated for small towns and individuals to deploy, operate, and maintain. The inventors created a system for collecting debris described herein to solve this problem.

The system for collecting debris in a water drainage system may be used to collect debris, such as pollution, from an outflow or outfall pipe (hereinafter referred collectively as outflow pipe). The system may include mechanisms to attach a collection net to an outflow pipe to capture debris. These attachment mechanisms may include one or more collars for attaching the collection net to the outflow pipe, and for supporting the weight of the debris collected in the collection net. In another example, the system for collecting debris may also include an alerting device that senses the presence or pressure of a certain quantity of debris in the collection net, and sends a radio signal to a remote receiver, when a threshold is exceeded. The signal provides an indicator to alert users of the presence of certain quantities of debris. For example, the threshold may be set to alert users when approximately fifty pounds of debris have accumulated in the collection net. Different configurations of the attachment mechanisms, the collection net, the alerting device, and other aspects of the system are described in more details in the detailed description.

DETAILED DESCRIPTION

Debris catching devices in the market today are typically installed around densely populated communities with large infrastructure, like cities, where they can be installed to large outflow pipes. These debris catching devices are typically massive and require the use of cranes and heavy machinery to install and maintain. These types of massive debris catching devices present numerous challenges for rural towns and suburban communities with smaller outflow pipes. The outflow pipe systems in these smaller communities are typically installed far from main highways, in areas that are not accessible to big machinery like cranes.

To solve this problem, inventors created a system for collecting debris described herein. The system for collecting debris includes a net to collect debris, at least one collar fixed to an outflow pipe, a movable collar with at least one attachment point to support the weight of the net, a pressure sensor for sensing the weight of the collected debris, and an alerting device for sending an electrical signal when the weight of the collected debris reaches a certain threshold. Described here are examples a collection net, collection net attachment and or fastening mechanisms, fixed and movable collars, an alerting device, and other aspects of the system for collecting debris.

Figure 1:
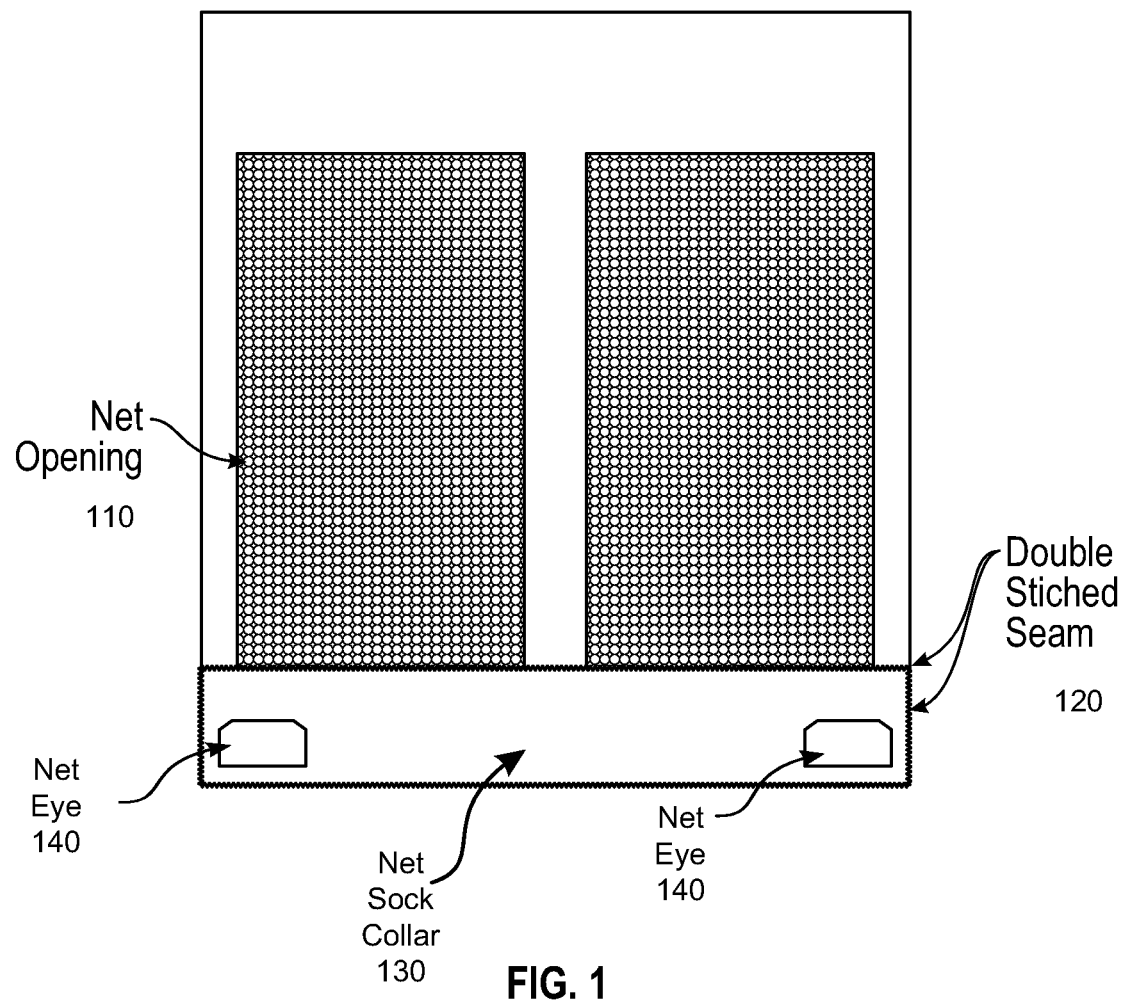
FIG. 1. depicts an example of a collection net that may be used in one implementation of a system for collecting debris, according to one embodiment.

FIG. 1 depicts an example of a Collection Net 100 that may be used in one implementation of System For Collecting Debris 200, according to one embodiment. As depicted here, Collection Net 100 includes an open end and a closed end. The open end is attachable to and removable from Outflow Pipe 250. Collection Net 100 may be tailored to fit these smaller scale outflow pipes with diameters measuring in the range of 25-inches to 60-inches. Collection Net 100 may be made of material with open texture having evenly spaced hole, that is durable and enables ease of manufacturing, and is constructed from lightweight materials, making it light enough for individuals to carry Collection Net 100 for proper disposal of debris. For example, Collection Net 100 may be made of durable mesh material, such as High-Density Polyethylene (HDPE), which is resistant to all weather.

This HDPE mesh material offers a small-hole size mesh option for capturing the most debris and allowing for the free flow of water. Additionally, these hole openings could be small enough to help keep wild creatures from entering and being trapped in the net. Illustrative materials include mesh with holes with diameter ranging between 0.75 and 0.2 inches. Here, Net Opening 110 represents a material with evenly spread holes that provide a 0.125-inch wide hole opening.

The shape of Collection Net 100 may be cylindrical, rectangular bag, vertical seam bag, horizontal seam bag, or x-bottom bag. A rectangular shaped Collection Net 100 may have cutouts of both corners on the interior side of closed end. These interior seamed cutouts offer durability and help keep debris from building up inside the corners of Collection Net 100, thereby enabling users to completely empty Collection Net 100 during a process of disposing collected debris. The side of the cutouts may be within a range of 10% to 20% of the length of a rectangular shaped Collection Net's 100. The side of the cutouts may be within a range of 15% to 25% of the width of a rectangular shaped Collection Net's 100. Overlapping seems like Double Stitched Seam (s)

120 add strength and durability to Collection Net 100. To enable Collection Net 100 to be carried by an individual user, Collection Net 100 may have handles at the far ends of the open-end side of Collection Net 100, where Net Sock Collar 130 is found. A cinch on Net Sock Collar 130 may be installed, such cinch may serve as reinforcement for the attachment of Collection Net 100 to Outflow Pipe 250.

As depicted here, Collection Net 100 may be shaped like a vertically seamed chip bag, with Double Stitched Seam(s) 120, Net Sock Collar 130, and Net Eye 140. Net Sock Collar 130 is an illustrative configuration of a seamed opening that would form part of the open-end side of Collection Net 100. Net Eye 140 is an illustrative example of an eye closure that may be used as part of a hook-and-eye attaching mechanism using Attachment Points 260. For example, Net Eye 140 may provide a means for attaching Collection Net 100 to Outflow Pipe 250, using Attachment Points 260 on Movable Collar 220 and Fixed Collar 230 (See FIG. 2 and FIG. 3).

For example, one or more Net Eye(s) 140 may move through Attachment Points 260 on Fixed Collar 230 and Movable Collar 220, and be fastened onto Attachment Points 260 of both Movable Collar 220 and Fixed Collar 230, to securely attach Collection Net 100 onto Outflow Pipe 250. This way of attaching Collection Net 100 still allows Movable Collar 220 to move along a longitudinal axis of Outflow Pipe 250 toward Fixed Collar 230 and impart pressure on Pressure Sensor Device 240.

Figure 2:
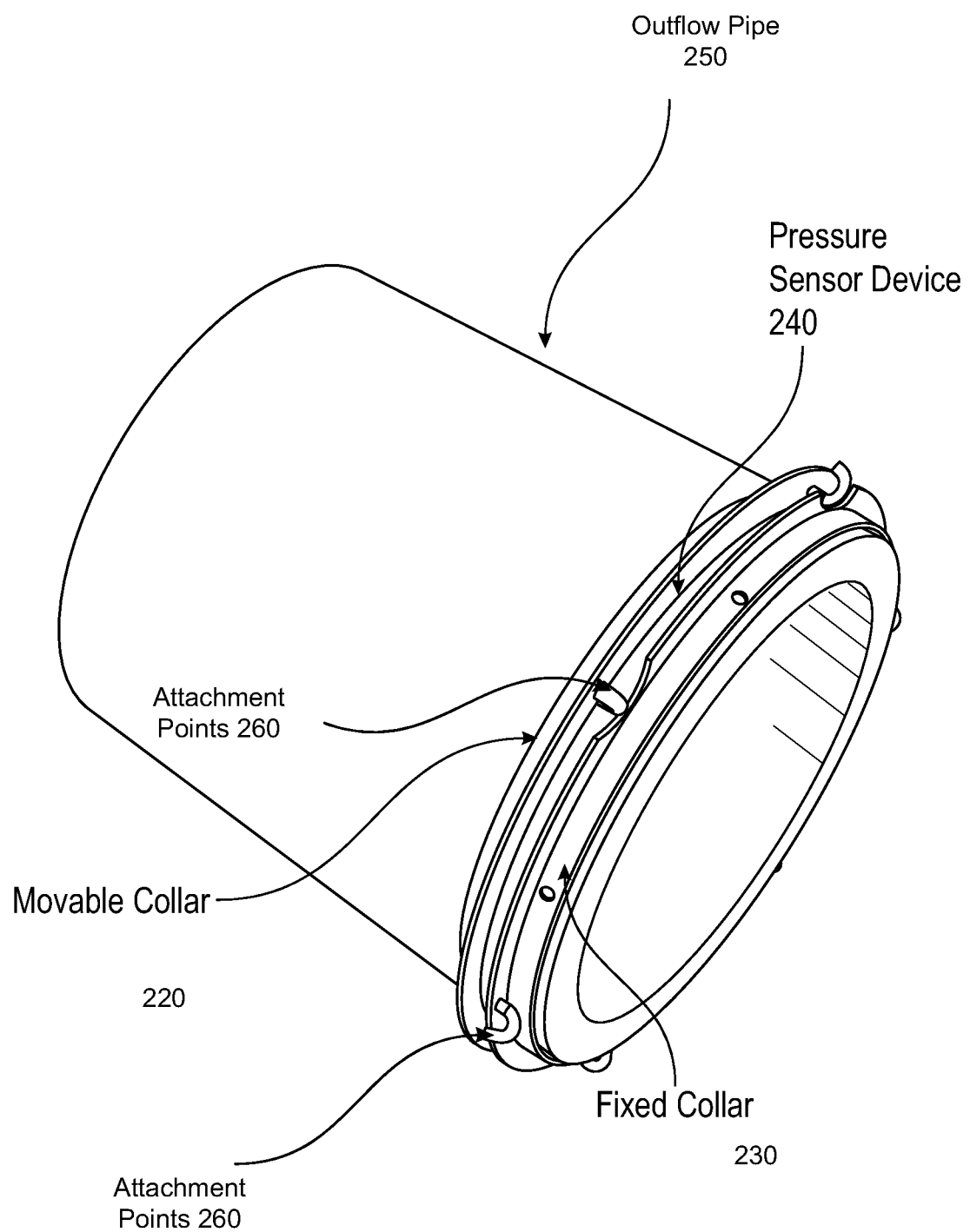
FIG. 2. depicts an example of a system for collecting debris, according to one embodiment.

FIG. 2 depicts an example System For Collecting Debris 200 using Outflow Pipe 250, Fixed Collar 230, Movable Collar 220, and Attachment Point(s) 260, according to one embodiment. Fixed Collar 230 may be configured to fit securely fastened on to Outflow Pipe 250 and include a means for mounting Pressure Sensor Device 240. Movable Collar 220 may be configured to fit on to Outflow Pipe 250. As described above, to attach Collection Net 100 to Outfall Pipe 250, Fixed Collar 230 and Movable Collar 220 may be configured to include Attachment Points 260 to attach Net Eye(s) 130. Attachment Points 260 may be hooks, for example. The placement of Attachment Points 260 on Movable Collar 220 would be such that these Attachment Points 260 would support most the weight of debris collected inside such Collection Net 100. Where the weight of debris inside Collection Net 100 increases, Movable Collar 220 would move toward Fixed Collar 230 along guide pins on the longitudinal axis of Outflow Pipe 250, thereby narrowing the gap between the collars and imparting pressure onto Pressure Senor Device 240 mounted on Fixed Collar 230.

Figure 3:
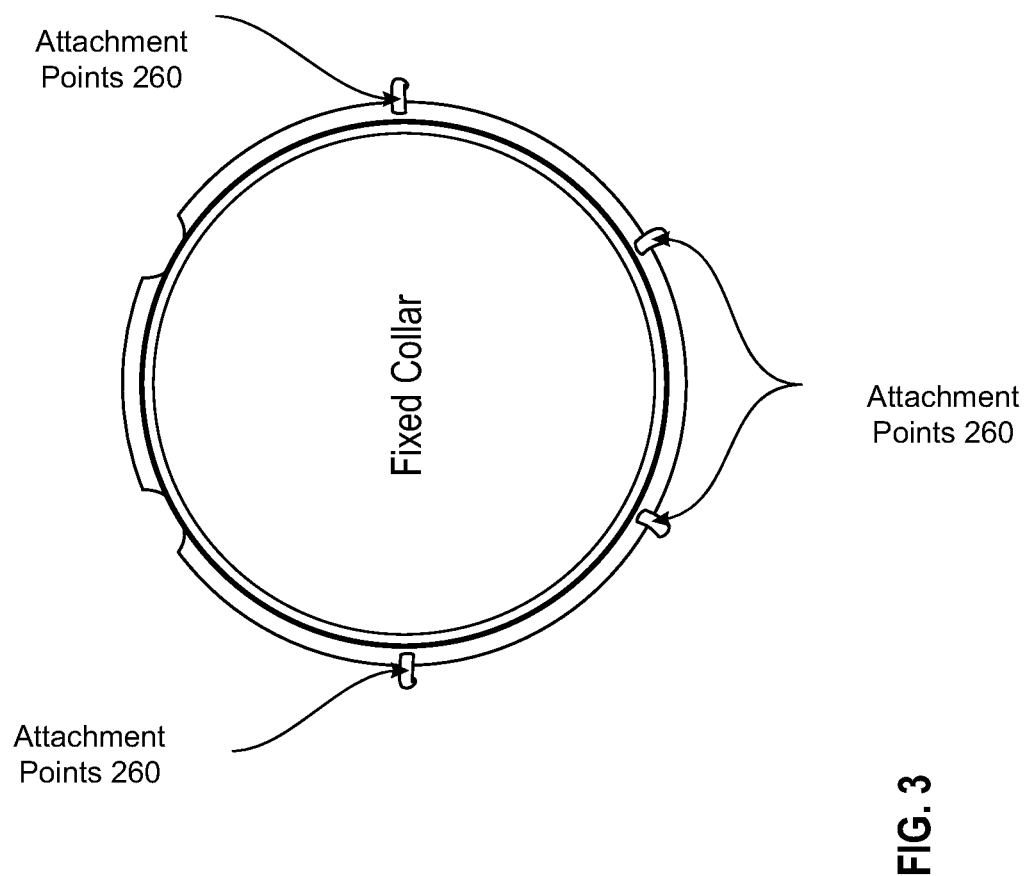
FIG. 3. depicts a perspective of attachment points in a system for collecting debris, according to one embodiment.
Figure 3:
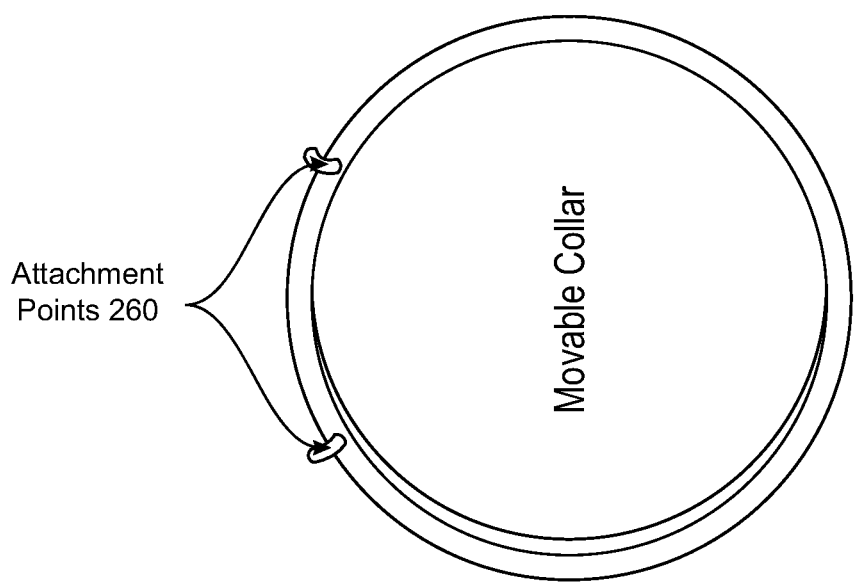

FIG. 3 depicts a perspective of Attachment Points 260 in System For Collecting Debris 200, according to one embodiment. As illustrated here, Attachment Points 260 may be located on upper portion of Movable Collar 220, such that over 50% of the weight of debris collected in Collection Net 100 would be supported by Attachment Points 260 on Movable Collar 230.

Figure 4:
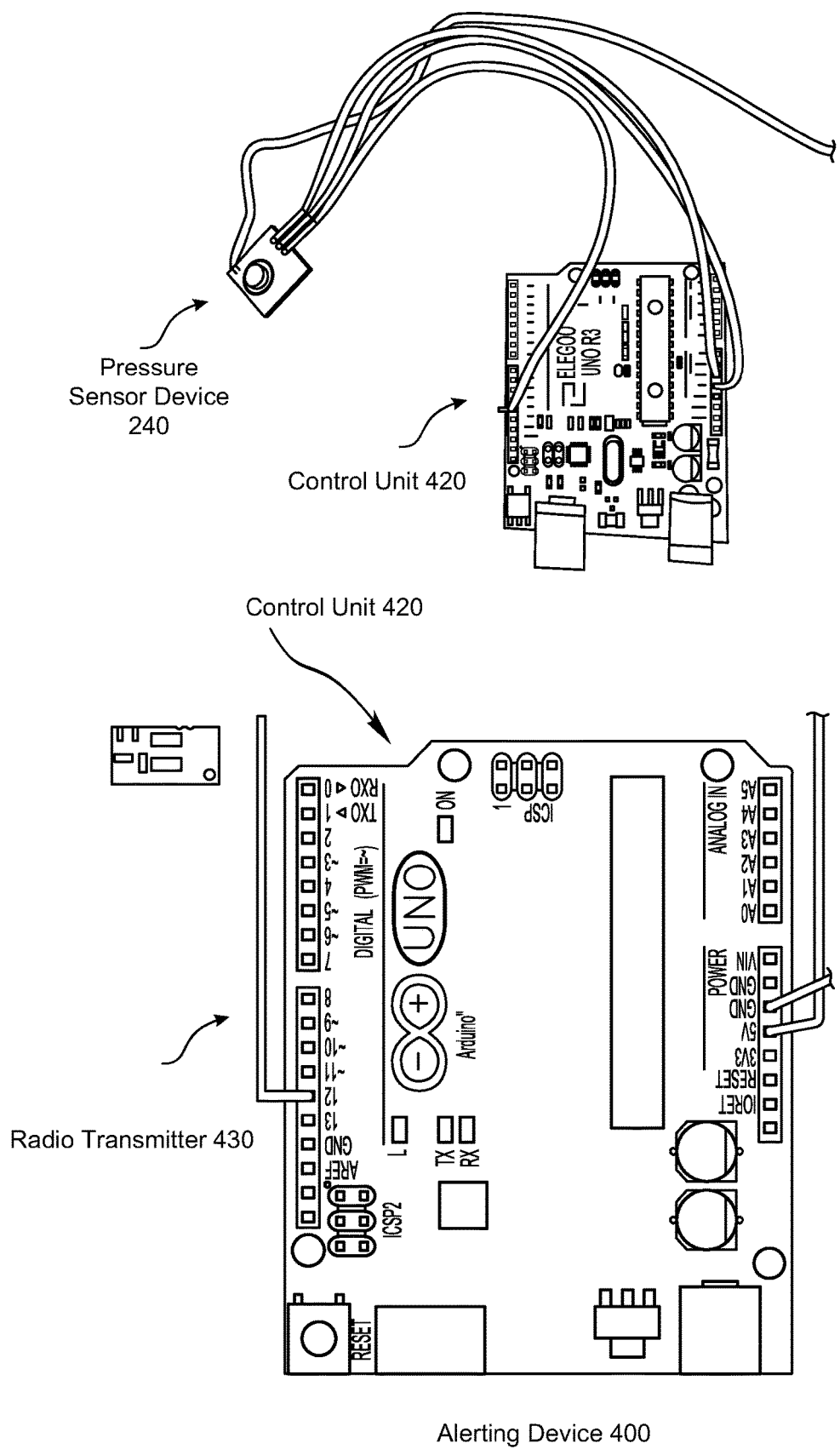
FIG. 4. depicts an example of an alerting device with a pressure sensor for collecting debris, according to one embodiment.

FIG. 4. depicts an Alerting Device 400 configured to work with Pressure Sensor Device 240, Radio Transmitter 430, and Controller Unit 420, as part of System For Collecting Debris 200, according to one embodiment. Pressure Sensor Device 240, for example may be configured from a tension sensor that indicates the amount of pressure exerted by flowing fluid and accumulating debris collected by Collection Net 100. An Arduino in Control Unit 420 could indicate when that pressure exceeds a predefined threshold limit. For example, the limit could be set to fifty pounds of pressure. Where threshold limit is exceeded, Control Unit 420 would send a radio signal via Radio Transmitter 430 to a receiver unit which may be installed in a different location from Alerting Device 400. For example, the radio receiver unit may be installed in a home near enough to receive the transmitted signal, up to two miles away from System For Collecting Debris 200. When the electrical signal from Control Unit 420 is detected, Radio Transmitter 430 may transmit a radio signal to the receiver unit, which in turn causes an indicator response to be triggered. An example of an indicator response may be an alert that turns on an LED light.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A system for collecting debris from an outflow pipe comprising:
   a first collar, the first collar having means for attaching to the outflow pipe;
   a second collar, the second collar configured to move along a longitudinal axis of the outflow pipe, the second collar including attachment points;
   a collection net having an open end and a closed end, the open end of the collection net being removably attached to the attachment points on the second collar;
   a pressure sensor attached to the first collar;
   a controller unit having a transmitter;
   wherein the second collar is configured to move toward the first collar in response to the collection net being weighed down by debris collected in the collection net, wherein the second collar is configured to impart pressure on the pressure sensor when the second collar moves toward the first collar, wherein the pressure sensor is configured to produce an electrical signal in response to the imparted pressure, the signal corresponding to the pressure sensed by the pressure sensor, and wherein the controller unit is configured to transmit a radio signal through the transmitter when the electrical signal reaches a threshold.

2. The system of claim 1, further comprising a receiver unit configured to turn on an indicator in response to detecting the radio signal.

3. The system of claim 2, wherein the indicator is a light, an alert on a display, or a sound.

4. The system of claim 1, wherein the attachment points are hooks.

5. The system of claim 1, wherein the attachment points are located on upper portion of the second collar such that over 50% of weight of the debris collected in the collection net is supported by the attachment points.

6. The system of claim 1, wherein shape of the collection net is a cylinder, a rectangular bag, vertical seam bag, horizontal seam bag, or x-bottom bag.

7. The system of claim 1, wherein the collection net is made of high-density polyethylene netting.

8. The system of claim 1, wherein the collection net comprises holes with width of a range of between 0.075 inches to 0.2 inches.

9. A device comprising:
- a collection net for collecting debris from an outflow pipe;
- a first collar having means for attaching the collection net to the outflow pipe and means for mounting a pressure sensor;
- a second collar having means for supporting weight of the collection net and the debris, the second collar also having means for imparting pressure on the pressure sensor in response to the collection net being weighed down by the debris; and
- a controller means for detecting an electric signal generated by the pressure sensor in response to the imparted pressure, the signal corresponding to the pressure sensed by the pressure sensor, and for transmitting a radio signal when the electric signal reached a threshold.

10. The device of claim 9, further comprising a receiver means for detecting the radio signal and providing an indicator in response to detecting the radio signal.

* * * * *